United States Patent Office.

CHARLES LAFAYETTE TUCKER, OF CHICAGO, ILLINOIS.

Letters Patent No. 92,907, dated July 20, 1869.

IMPROVED MANUFACTURE OF CHIPPED BEEF.

The Schedule referred to in these Letters Patent and making part of the same.

*To all whom it may concern:*

Be it known that I, CHARLES LAFAYETTE TUCKER, of the city of Chicago, in the State of Illinois, have invented or discovered a new and improved Manufacture; and I do hereby declare that the following is a full, clear, and exact description thereof, sufficient to enable those skilled in the art to make and use the same.

My invention or discovery consists in slicing or chipping dried or smoked beef, ready for the table, and enclosing the same, in marketable form, within some suitable integument, so that the same being protected from the action of the air, may be preserved without waste for an indefinite period, remaining moist and free from mould, and at all times ready for immediate use.

Dried beef, when finely and evenly chipped, free from mildew or mould, and retaining a proper portion of its natural moisture, is a delicious relish and an economical article of food.

As usually handled and kept, it is subject to great waste, and its suitable preparation for the table is inconvenient.

It is liable to become mildewed or mouldy, or to become fly-blown and wormy, and when kept for a long time, the exterior and the thin portions become exceedingly dry and hard, and sacking will not obviate these difficulties.

For table-use, very thin slices are required, and if prepared any length of time before use, the slices become dry and hard, unless protected by suitable means, and the process of chipping by hand is difficult and laborious.

By the use of my mode of preserving dried beef in a chipped or sliced form, and the use of a proper casing or integument, all of these difficulties are avoided, for, by reason of slicing or chipping it, as soon as the moisture is reduced to the proper degree, I am enabled to reduce it to a compact form, so that, in any event, only a small surface is exposed to the action of the atmosphere, and by enclosing it in this compact form, in a suitable air-tight casing or integument, all further reduction of the moisture ceases, and it is fully protected from all attacks of worms, flies, mould, mildew, or other fungi.

In preparing dried beef by my mode or process, the beef is dried or smoked in any of the well-known modes. I then chip it or slice it into the desired grades, either by machinery or by hand, according to the amount to be put up, and, when chipped, the slices are pressed into suitable forms, to receive the casing or integument, or are pressed directly into the casings, as may be desired, or be most convenient.

The pressure should be sufficient to so compress the slices that the air will be excluded, but not so severe as to make a solid mass of the chips.

I prefer, and usually use for a casing, light boxes, made of thin wood, (veneers,) and so constructed as to hold a measured or weighted quantity, and for purposes of transportation and convenience of packing, I prefer to make such casings angular or square.

Similar boxes or casings may be made of strawboard, or other paper, and the slices may be compressed into globular or cylindrical forms, and enclosed in an integument or casing of cloth or thin paper.

It will be obvious that the cylindrical form can be used for any of the casings or integuments.

The integuments may be rendered impervious to the action of the atmosphere, and to any moisture which may remain in the beef, by any of the usual or well-known appliances, and the packages may be dipped in liquid carbolic acid, without injury, and with beneficial results.

The packages can be supplied to the market with a single casing or integument, when such casings are rendered impervious, as above described.

It will be found a more desirable practice not to so treat the casings, but to make them of the desired material, as it is found, and render the packages impervious by an additional coating or covering. That covering which will be equally good and give the best appearance, is metallic-foil paper, put on or made to adhere with silicate of soda, or "liquid glass," which will prevent mildew or mould, and is not easily affected by heat or moisture, and is equally applicable to wood, cloth, or paper.

Other adhesive substances, and other covering-material may be used; but I prefer those named.

For some markets, a simple coating of the integument, with a preparation of gum, or a suitable varnish, will be found sufficient, but an additional outer coating of foil or foil-paper will give the packages a more finished appearance; and when a coating is applied to the package, or a surfacing or saturating-process is applied to the material of which the integument is made, any ordinary paper may be used for the outer covering, as such covering then has no direct preservative effect.

Having thus fully described my invention,

What I claim as new, and desire to secure by Letters Patent, is as follows:

1. The mode herein described of preserving dried or smoked beef, by chipping or slicing and compressing such slices into a compact form, and enclosing such packages in air-tight integuments, substantially as specified.

2. As a new article of manufacture, smoked or dried beef, when sliced or chipped ready for use, and enclosed in any close-fitting integument, substantially as and for the purposes specified.

CHARLES L. TUCKER.

Witnesses:
E. A. WEST,
O. W. BOND.